(No Model.)

G. M. CONOVER.
GAGE KNIFE.

No. 417,859. Patented Dec. 24, 1889.

WITNESSES
W. R. Edelin,
Will B. Sage

INVENTOR
Geo. M. Conover.

By Leggett & Leggett
ATTORNEYS

N. PETERS, Photo-Lithographer, Washington, D. C.

UNITED STATES PATENT OFFICE.

GEORGE M. CONOVER, OF CLEVELAND, OHIO.

GAGE-KNIFE.

SPECIFICATION forming part of Letters Patent No. 417,859, dated December 24, 1889.

Application filed September 3, 1889. Serial No. 322,883. (No model.)

*To all whom it may concern:*

Be it known that I, GEORGE M. CONOVER, of Cleveland, in the county of Cuyahoga and State of Ohio, have invented certain new and useful Improvements in Potato Parers and Slicers; and I do hereby declare the following to be a full, clear, and exact description of the invention, such as will enable others skilled in the art to which it pertains to make and use the same.

My invention relates to improvements in potato parers and slicers, the device being equally well adapted to pare or slice apples or other fruits or vegetables; and it consists in certain features of construction and in combination of parts hereinafter described, and pointed out in the claims.

Figure 1:
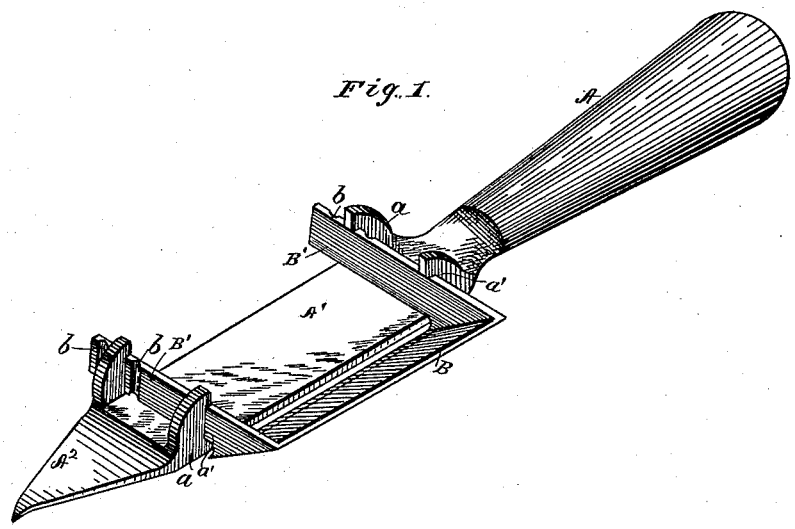
Figure 2:
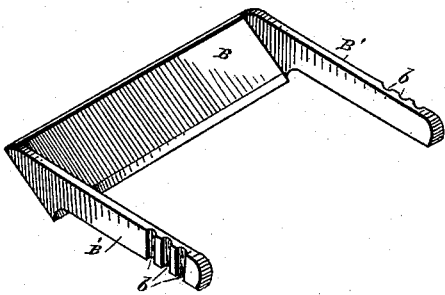

In the accompanying drawings, Figure 1 is a view in perspective of the potato parer and slicer complete. Fig. 2 is a perspective of the knife detached.

A represents the handle, the same terminating in or being connected with a comparatively broad plate A', the latter having a smooth and approximately flat under surface. Plate A' preferably terminates in a pointed blade $A^2$, for coring or digging out the eyes or defective portions of the potato or other vegetable or fruit.

B is the knife, the same having shanks B' extending approximately parallel, as shown, from the ends of the knife-blade, such shanks, however, diverging slightly and having a series of notches $b\ b$ on the outer sides and near the ends thereof, the plane of the knife being oblique with the line of the shanks, as shown more clearly in Fig. 2. Plate A' has upturned members—for instance, ears $a$—the form thereof not being material, except that these upturned members have seats or notches—for instance, as shown at $a'$—for receiving shanks B' of the knife. The knife may be entered from either side to render the device right or left handed, as preferred, and shanks B' being, as aforesaid, slightly divergent, it is necessary to slightly compress the shanks—that is to say, to deflect them toward each other to enter them in their seats and the recoil of these shanks, after having been thus compressed, causing the respective notches $b$ to firmly engage the opposing edges of ears $a$. With the inner notches $b$ engaging the opposing ears the knife is supposed to cut a thin paring or slice. By moving the knife so that the next notches $b$ engage the opposing ears the edge of the knife is farther removed from plate A', so as to cut a thicker paring or slice, and so on. The knife is usually adjusted at the inner notches for paring, and in case of slicing the knife may be adjusted to cut thick or thin, as may be preferred. By pressing inward with the fingers on the extremes of shanks B' notches $b$ are disengaged from the opposing ears, so that the knife is quickly and easily adjusted from one notch to another, or the knife may be withdrawn for cleaning, sharpening, or reversing.

The body of the device may be constructed of tin or other sheet metal and the handle may be of such sheet metal or of wood, as preferred; or the utensil may be constructed of malleable cast iron with the members except the knife integral. The form of members A, A', $A^2$, and $a$ may be varied indefinitely without departing from the purpose and spirit of my invention.

What I claim is—

1. In a potato parer and slicer, the combination, with a plate, of a removable knife and means for securing the cutting-edge of the knife in close proximity to either edge of the plate, substantially as set forth.

2. In a potato parer and slicer, the combination, with the body of the device, the same having upturned members provided with notches or seats, substantially as indicated, of a knife having approximately parallel spring-shanks adapted to enter or engage such notches or seats, such shanks having notches for adjusting the knife for cutting thick or thin, substantially as set forth.

3. In a potato-parer, the combination, with a plate having upturned members, of a knife having shanks adapted to engage said members, substantially as set forth.

In testimony whereof I sign this specification in the presence of two witnesses this 27th day of July, 1889.

GEORGE M. CONOVER.

Witnesses:
CHAS. H. DORER,
ALBERT E. LYNCH.